United States Patent [19]

Sharp

[11] 4,403,550

[45] Sep. 13, 1983

[54] PROCESS FOR PLANOGRAPHIC PRINTING

[75] Inventor: Thomas K. R. Sharp, Bloomingdale, Ill.

[73] Assignee: PPG Industries, Inc., Pittsburgh, Pa.

[21] Appl. No.: 291,182

[22] Filed: Aug. 7, 1981

Related U.S. Application Data

[60] Division of Ser. No. 147,045, Aug. 23, 1979, Pat. No. 4,304,601, which is a continuation of Ser. No. 895,628, Apr. 12, 1978, abandoned, which is a continuation of Ser. No. 689,381, May 24, 1976, abandoned, which is a continuation-in-part of Ser. No. 631,433, Nov. 13, 1975, abandoned, which is a continuation-in-part of Ser. No. 583,837, Jun. 4, 1975, abandoned.

[51] Int. Cl.$^3$ .............................................. B41M 1/00
[52] U.S. Cl. .................................... 101/452; 101/142; 101/147; 101/451
[58] Field of Search ................. 101/142, 147, 451, 452

[56] References Cited

U.S. PATENT DOCUMENTS

| | | | |
|---|---|---|---|
| 2,693,449 | 11/1954 | Hain et al. | 252/42.1 |
| 2,705,700 | 4/1955 | Iler | 252/28 |
| 2,717,246 | 9/1955 | Kienle et al. | 106/28 X |
| 2,732,355 | 1/1956 | Ryan | 260/22 |
| 2,812,266 | 11/1957 | Golding | 260/22 A |
| 2,866,711 | 12/1958 | Hart | 106/22 |
| 3,151,993 | 10/1964 | Bundy | 106/22 |
| 3,406,137 | 10/1968 | Terry et al. | 106/31 X |
| 3,436,234 | 4/1969 | Terry et al. | 106/20 |
| 3,511,178 | 5/1970 | Curtin | 101/450 |
| 3,615,791 | 10/1971 | Thomas et al. | 106/32 X |
| 3,697,268 | 10/1972 | Ohta | 101/465 X |
| 3,834,823 | 9/1974 | Seregely et al. | 106/20 X |
| 3,834,909 | 9/1974 | Usai et al. | 101/465 X |
| 3,880,785 | 4/1975 | Piiroya | 106/28 X |
| 3,886,865 | 6/1975 | Ohto et al. | 101/465 |
| 3,945,830 | 3/1976 | Yazawa et al. | 101/465 |
| 3,945,957 | 3/1976 | Noshiro et al. | 260/22 S |
| 3,948,827 | 4/1976 | Noshiro et al. | 260/22 S |

FOREIGN PATENT DOCUMENTS

| | | | |
|---|---|---|---|
| 1101453 | 3/1961 | Fed. Rep. of Germany | 106/32 |
| 1152269 | 5/1969 | United Kingdom | 101/465 |

OTHER PUBLICATIONS

Ranney "Why Silicones Are Used In Inks," Reprinted from American Ink Maker, May, 1968.

*Primary Examiner*—Theodore E. Pertilla
*Attorney, Agent, or Firm*—William J. Uhl

[57] ABSTRACT

A novel ink formulation, especially useful in Driography printing, is disclosed. The ink formulation comprises a basic planographic printing ink vehicle, a pigment, a modifying varnish and a flow control agent to provide an ink, especially suitable for use in Driography, which exhibits desirable hangling-viscosities under ambient conditions, improved rheological properties under severe press-operating conditions, and provides printings having sharp delineation, fidelity and excellent reproducibility in depth of color tones in long press runs. The basic printing ink vehicle may be a vehicle designed for either sheet-fed or heat-set printing systems. The novel ink formulation is designed to have a high viscosity and avoid becoming pseudoplastic in its behavior at higher press temperatures, which generally can range from about 85° F. to 125° F., and preferably, avoids becoming pseudoplastic at temperatures up to about 140° F. or more.

8 Claims, No Drawings

PROCESS FOR PLANOGRAPHIC PRINTING

This application is a division of application Ser. No. 147,045, filed Aug. 23, 1979 now U.S. Pat. No. 4,304,601, which is a continuation of application Ser. No. 895,628, filed Apr. 12, 1978, now abandoned, which is a continuation of application Ser. No. 689,381, filed May 24, 1976, now abandoned, which is a continuation-in-part of application Ser. No. 631,433, filed Nov. 13, 1975, now abandoned, which is a continuation-in-part of application Ser. No. 583,837, filed June 4, 1975, now abandoned.

This invention relates to planographic printing inks. It particularly concerns novel inks, especially adaptable for use in a planographic printing process known as Driography, which comprise a basic planographic printing ink vehicle, a pigment, a selective modifying varnish and a flow control agent, and, advantageously, certain tack maskers.

BACKGROUND OF THE INVENTION

In planographic printing, as the term implies, both the image and non-image areas lie substantially in the same plane. The non-image areas are made ink-repellent, so that when ink is applied by roller to the plate surface, only the image areas accept the ink for transfer to a copy sheet. Lithography is the best known form of planography and has heretofore been the only known practical and successful process of planographic printing. It works on the theory that water and oil are immiscible. The non-image areas are made water-receptive (hydrophilic), and when water-wet they repel the oily ink. The image areas are ink-receptive (organophilic) and water-repellent (hydrophobic). On the press, the plate conventionally is first dampened with a fountain solution (which wets the background or non-image areas), after which ink is rolled over the plate by form rollers. The ink coats the image areas, but is repelled from the dampened non-image areas.

In present times, most lithography is done by "offset", wherein the plate does not itself contact the copy sheet, but instead contacts a rubber-like blanket roller, or cylinder during each revolution. The blanket receives the ink image and, in turn, revolves and transfers ("offsets") it to the copy sheet.

Lithography was well established as a separate branch of the printing industry in the early 1900's. Because a number of advantages are realized by the planographic method of printing, lithographic printing has been a well-recognized and widely-accepted part of the printing art for many years. Despite numerous developments and improvements which have been made over the years, and notwithstanding difficulties inherent therein, lithography has retained its total reliance on the original concept that water which is coated over the non-image areas of a printing surface, being immiscible with oil, will reject an oil-based printing ink.

One of the difficulties inherent in having both ink and fountain, or dampening, solutions present is that the dampening solution applied to the plates flows back into the train of inking, or form rollers on the press, during the course of the printing run, causing emulsification of the ink. In addition to back flowing, the fountain solution also tends to flow forward over the offset or blanket cylinder, moistening the paper causing it to curl and change dimension. This creates special difficulties in securing accurate registration in color printing where the paper undergoes multiple passes through the presses. Control of the delicate balance between ink and fountain solution, which is necessary to produce image fidelity and uniformity, is difficult to maintain, and must be constantly watched, especially as conditions change on the press during the course of a printing run. This is further complicated by the difficulty in maintaining the desired chemical consistency of the fountain solution on the press, especially in long press runs. The fountain solution is generally a mixture of water, acid, buffer and gum designed to keep the non-image areas of the plate passivated and ink repellent to prevent them from receiving ink. The nature of the fountain solution affects the working properties of the ink being used. Too much acid causes image removal (sharpening), retards drying and causes roller stripping. Too much gum encourages emulsification. The lithographic process requires that a balance be maintained between ink and fountain solution. If the water layer on the plate falls below a certain point, the ink begins to catch up into the non-image areas and scumming, or sensitization of the non-image areas, occurs. Scumming can be eliminated by increasing the amount of water reaching the plate or by lowering the temperature of the fountain solution. This latter change increases the viscosity of the ink on the plate and form rollers making it less mobile and thereby less prone to water pick-up and mechanical breakdown into the non-image areas. In an effort to minimize these problems, the proper formulation of fountain solution itself has become a highly complex and demanding art since the fountain solution in many cases determines the level of artistic and commercially acceptable quality which can be attained in lithographic printing.

During the more than half-century in which lithography has been an established commercial form of printing, in which the desirability of eliminating the step of dampening the plate with water has been recognized, no one was able to develop a successful planographic printing plate having a printing surface with background areas that are ink-repellent without being pre-wet by an ink-immiscible liquid until the recent advent of Driography. Driography provides for the first time a substantially simplified planographic printing process wherein need for all the sophisticated dampening systems has been obviated.

A Driography printing plate and process are described in U.S. Pat. No. 3,511,178 to J. L. Curtin, herein incorporated by reference. The Driography process is based on the properties of the plate involving adhesion. In general, Driography comprises a printing plate having a background surface, or non-image area with a sufficiently low adhesion to the printing ink so that, without pre-wetting the plate, the ink that is applied to the plate in such areas will not split away and transfer from the inking rollers to the plate. That is, the adhesion of the ink to the inking roller and the cohesion forces between the ink particles are both greater than the adhesion between the ink and the surface of the plate and the ink will not transfer to the surface. Although when a press utilizing Driography is started up, the ink spreads over the entire printing plate, the non-image areas of the plate are rapidly cleaned by the form rollers since the forces between the roller and the ink are greater than the forces between the ink and non-image areas.

Driography has many advantages over conventional lithography. The printing quality and cosmetic appeal of the final product are better than conventional lithography utilizing a wet offset process. The press can operate at faster speeds. The makeready is shorter and easier, since there is no need to achieve a balance between the ink and fountain solution or the solution and the printing plate, each of which balances, in conventional, wet lithographic processes, requires a considerable amount of time to achieve, as well as constant monitoring to maintain them for successful printing. Furthermore, the absence of the fountain solution system makes the process more economical.

Although Driography has these and other advantages, it results in the provision of new problems which require resolution if the apparent advantages provided by Driography are to be utilizable in a practical manner. An evaluation of planographic inks can be divided into three categories, (1) those which evaluate the handling characteristics of the ink under ambient conditions; (2) those which relate to how the ink will perform on a press; and (3) those which relate to the quality (e.g., the physical, optical and chemical properties) of the printing produced.

An example of the new problems created involves the absence of the fountain solution system which results in the press heating up and the printing plate reaching higher temperatures than in conventional, wet lithography where approximately 40% of the water of the fountain solution evaporates from the press and in doing so, cools the rollers and the printing plate. In a conventional, wet lithographic process, the press will normally run at temperatures up to about 90° to 100° F., depending upon ambient conditions, air-conditioning in the press room, etc., and the printing plate to which the ink is applied will typically be about 10° F. below this press temperature. In Driography, the printing press will normally be about 10° F., or more, higher than the wet press temperature due to the absence of the fountain solution. Because of this extra heat in Driography, and the loss of the acid present in the fountain solution which immobilizes part of the ink drying system to provide a retarding effect upon ink drying, conventional lithographic inks tends to dry on the press faster in Driography than in conventional, wet lithography. For example, a 10° C. rise in press temperature in general doubles the ink drying rate so that the ink dries on the press in approximately one-half the time. Since the temperatures in the press are approximately 20° F., higher in Driography than in wet lithography, conventional lithographic inks tend to dry on the press when used in Driography and do not move through the press properly to transfer to the copy sheet.

Press stability is, therefore, not as good with Driography as it is with conventional wet lithography. By press stability is meant the ability of the ink, under press-operating conditions (e.g., temperatures and shear rates), to move through the press (e.g., through the rollers, plate and blanket and transfer to and from the printing plate) and the tendency of the ink not to dry in the roller train, plate and blanket. The application and form rollers in the printing process both supply ink and keep the printing plate clean by removing ink from the non-image areas of the plate. An ink has low press stability when the ink dries in the roller train, on the printing plate or blanket, or if the ink fails to transfer from the form rollers to the printing plate.

Toning is another example of a problem with Driography. Toning occurs when ink is not refused by the non-image areas of the printing plate. The result of toning is the application of ink to the copy sheet in the non-image areas. Toning may be in the form of a light background color in the non-image areas of the copy sheet so that the copy sheet appears dirty. In severe toning, the background, or non-image areas of the copy sheet, merge into the printed, or image, areas.

Toning can be related to temperature. The toning temperature of an ink is that temperature at which the ink, under given shear rates, loses internal cohesion and becomes pseudoplastic in behavior. At this temperature, control of ink application, i.e., ink being picked up from the printing plate by the form rollers, is lost. Toning is, accordingly, analogous to scumming in conventional, wet lithography. Conventional lithographic inks have very low toning temperatures when used in Driography, working well in Driography at about 75° F., and below. Although some conventional lithographic inks will function at slightly higher temperatures, e.g., up to 85° F., their utility is limited by uncertainty of operation and limitations on color.

Conventional planographic inks do not perform well in Driography printing. They are not press-stable, particularly under the high temperatures and shear rates occurring in Driography printing, which does not have the advantages provided by a fountain solution. In addition, toning is produced and the quality of the printing itself is less than that desired.

It is considered that at low shear rates, typically the Driography ink system should be near Newtonian and at high shear rates, it should move into the dilatant zone. This accounts for the plate/form roller behavior to give a wipe action of the form roller over the plate with the ink tending to break clean from the low energy surface. In this type of system, the faster the roller movement, the more resistant to movement there is from the system. In addition, the Driography ink system tends to heat up and is, therefore, temperature sensitive.

DESCRIPTION OF THE INVENTION

The present invention is directed to improved planographic printing inks, especially suitable for use in Driography processes.

An object of the present invention is the provision of planographic inks which are suitable for use in a Driography printing system. Another object is the provision of such inks which exhibit viscosities suitable for handling under ambient conditions. Still another object is the provision of such inks having rheological properties (e.g., viscosity, flow, adhesion, and tack) which result in advantageous performance under the conditions of temperature and stress encountered on a Driographic press, particularly across a broad range of press-operating temperatures, e.g., 85° to 140° F., which range involves temperatures higher than temperatures suitable for use with conventional wet lithographic inks, while exhibiting high press stability and with the avoidance of toning. The non-image area of the dry plate used in Driography is usually a layer of silicone rubber having a low energy surface. Still another object is the provision of such inks having such rheology which are not deleteriously affected significantly by interaction between the vehicle-pigment ingredients of the ink. Another object is the provision of such inks which exhibit high viscosities and internal cohesion, and, low yield value and surface energy, and thus are able to flow, transfer and lay down across the broad range of press-operating conditions including the range of temperatures mentioned above, and at low and high shear rates (e.g., those produced by high press speeds, e.g., up to 1000 fpm, or more), while maintaining high viscosities and internal cohesion, and avoid pseudoplasticity. Another object, is the provision of such an ink having a low tack while avoiding substantial syneresis in both the stressed and unstressed state. Syneresis further deleteriously affects the flow of the ink through, transferability of the ink within, and trapping recovery of overprint during, the printing operation.

Still another object is the provision of such an ink which provides high quality printing, e.g., printings which are sharp and exhibit fidelity, excellent reproducibility in depth of color tone, absence of toning and are rub resistant.

These and other advantageous objects are accomplished by the inks of the present invention which exhibit a unique balance of rheological properties and advantageous performance characteristics, particularly under the severe press-operating conditions encountered in Driography, and which provide high-quality printings.

The unique balance of rheological properties and advantageous performance characteristics and high quality printings are provided by a novel combination of components, co-acting with one another, to enhance each of their beneficial effects and, simultaneously, to alleviate their deleterious effects, to the novel planographic inks.

The novel inks of the present invention comprise a basic planograhic printing ink vehicle, a pigment, conventional ink ingredients, a selected modifying varnish, and a flow control additive, and, advantageously, certain tack maskers. The basic ink vehicle may be designed for use in a heat-set printing system where the inks are dried by heat or may be designed for use in a sheet-fed printing system where the inks set and dry by oxidation. The basic vehicle can be a gelled (either chemically- or physically-gelled) or a non-gelled vehicle. A "chemically-gelled vehicle" is one wherein the vehicle has been gelled as a result of chemical reaction with a "chemical-gelling agent", as distinguished from a "physically-gelled vehicle", which is a vehicle basically gelled as a result of physical interaction between the vehicle and a "physical-gelling agent". The gelling of the vehicle is another aspect of the present invention since it enhances the thermal stability of the ink and diminishes the prospect of toning. Chemically-gelled vehicles are preferred. In another aspect of the present invention, a non-reactive polyamide is employed with chemically-gelled vehicles to further increase the viscosity of the inks.

The selected modifying varnish is incorporated in amounts sufficient to impart certain desired rheological properties to the ink, e.g., a high viscosity and internal cohesion, low yield value, and the maintenance of a high viscosity at the elevated press temperatures and high press speeds (shear rates) encountered in Driography, and thus good transference and flow characteristics of the ink through the press. The particular modifying varnish employed is from a certain selective group of such varnishes and within that group, is selected, depending upon the composition of the basic planographic vehicle and the particular pigment used, to "modify" and provide the desired vehicle-containing ink.

The flow control additive is added to impart certain rheological properties, e.g., to contribute to the high viscosity and internal cohesion of the ink, provide some flow or low yield value, and decrease the surface energy of the ink with respect to the non-image area, and thus assist in keeping the ink off the non-image areas. It is added in amounts which do not deleteriously alter the viscosity characteristics imparted by the modifying varnish. The internal cohesion is sufficient to maintain wetting and transference of the ink to the image areas of a printing plate whereas the surface energy is sufficiently low that the ink does not wet the non-image areas of the printing plate within the plate operating range of temperatures.

The use of the basic vehicle, selected modifying varnish, and flow control additive, provide novel inks having high viscosity and internal cohesion with some flow or low yield value, increase the toning temperature of the ink, and thereby reduce the prospect of toning on the copy sheet at the high press temperatures and high press speeds used in Driography.

The inks of this invention have a high viscosity, generally above 300 poise at 40° C. for an ink designed to be used in a sheet-fed system and above 100, typically in the range of about 125 to 175 poise at 40° C., for an ink to be used in a heat-set system. The viscosity is measured with a cone and plate type viscometer. It has a low yield value, generally below about 5000 dynes/cm$^2$, preferably below about 3000 dynes/cm$^2$ as measured on the Laray viscometer. An ink having a zero yield value is preferred. Conventional wet lithographic inks have yield values of about 10,000 to 20,000 dynes/cm$^2$. Many inks having such high yield values do not work well in Driography because droplets tend to break off in contact with the plate and not be drawn back onto the form rollers.

The desired viscosities of the inks of this invention are high in relation to the viscosities normal for conventional inks designed for use in other lithographic systems. Conventional lithographic inks for use in a sheet-fed system typically have a viscosity at 40° C. of about 90 to 100 poise and such inks for use in a heat-set system typically have a viscosity at 40° C. of 40 to 50 poise, or less.

A high viscosity system is, however, usually accompanied by high tack, i.e., 25 to 40 as measured on an Inkometer at 1200 RPM and 90° F. over 1 minute, and a flying tendency, i.e., where a fine mist of charged particles is thrown off by the fast moving rollers. All tack measurements referred to herein are similarly obtained unless otherwise stated.

The high tack associated with the system is advantageously reduced by the addition of tack masking amounts of a vehicle-modifying varnish, tack masker which is compatible with, and does not deleteriously affect, the novel inks of the present invention.

The basic planographic printing ink vehicle is the pigment carrier and provides such characteristics as drying, hardness, gloss, chemical resistance and printing qualities. It is employed in amounts sufficient to carry the pigment, as a dispersion, for instance, during the printing operation and conventional vehicles include drying oil and synthetic drying oil; natural or modified resins such as rosin, copal, dammer, shellac, hardened rosin and rosin esters; synthetic resins such as phenol resin, rosin modified phenol resin, 100% phenol resin, maleic acid resin, alkyd resin, petroleum resin, vinyl resin, acrylic resin, polyamide resin, epoxy resin, aminoalkyd resin, polyurethane resin and aminoplastic resin; cellulose derivatives such as nitrocellulose and ethyl cellulose; rubber derivatives such as chlorinated rubber, cyclized rubber; and others such as glue, casein, dextrin and zein.

The preferred basic vehicles include the phenolic and maleic resins. The resin can be used in making an oil-based vehicle and is advantageously modified by incorporating it into an oil. The modified resin is preferably gelled with a chemical gelling agent, such as a metallo-organo one, e.g., an aluminum complexing agent. A solvent can also be added to adjust the viscosity and tack, if desired. Oils suitable for use in preparing the basic vehicle system include linseed oil, lithographic varnishes which are heat-bodied linseed oils, and long oil, linseed alkyl resins which are commercially available. Linseed oil will have a viscosity of about 0.5 poise and the linsed lithographic varnishes will have a viscosity in excess of 150 poise. Suitable alkyl resins for use as an oil component in the printing ink vehicle are formed by condensation of polybasic acids, e.g., phthalic anhydride, terephthalic acid, isophthalic acid, etc., with polyhydric alcohol, e.g., glycerol, and modified with drying oils such as linseed oil. For printing ink use, they are modified to give a long oil system, e.g., in excess of 70% oil length. Commercially available alkyl resins include Iovite I-57, Iovite I-110, and Iovite C-428, sold by Iovite Chemicals, Inc., and Terlon 3, sold by Lawter Chemicals and are available in viscosities from about 5 to 500 poise. The resin is modified by the oil which lacks hardness and gloss when used alone. Suitable resins include the commercially available esterified, rosin modified, phenolic resins and esterified, rosin modified, maleic resins. These phenolic resins are generally made by esterifying a rosin such as polypale rosin or dimerized rosin with an esterifying polyhydric alcohol such as pentaerithritol, glycerine or sorbitol and reacting the product with a substituted phenol which can be paraoctylphenol, bis-phenol A, o-phenylphenol, xylenols, cresols, etc. There will normally be about 20 to 30% phenolic modification of the resin. Commercially available phenolic resins include M-93, M-88 and Ameberol F-7 of Union Camp Co. and Krumbaar K-1387 of Lawter Chemicals Company. The maleic resins are typically produced by forming an adduct of a rosin, e.g., gum rosin, and maleic anhydride and esterifying with a polyhydric alcohol such as glycerine or pentaerithritol. The maleic content of the resin is typically about 7 to 14%. Arochem 532 and 533 of Ashland Chemicals are suitable maleic resins. A high boiling, low aromatic and olefinic content, hydrocarbon solvent is generally used in combination with the oil and resin. The parafinic, saturated cyclic solvents such as Magie 470, Magie 500 or Magie 535 are suitable. These solvents boil above 450° F. and contain less than 15% aromatics and olefins.

The basic vehicle viscosity typically should be about the same as the ink system, i.e., above about 300 poise at 40° C. for an ink to be used in a sheet-fed system and above 100 to 125 poise at 40° C. for an ink to be used in a web system. These initial viscosities, however, are generally lowered upon the addition of additives during the formulation of the ink. The viscosity may be varied by varying the proportions of oil, rosin and solvent in the vehicle, use of a complexing or gelling agent, amount of gelling agent, addition of polyamide, etc. Generally, the vehicle will contain about 40 to 60% by weight resin, about 15 to 40% oil and about 15 to 35% solvent. For a sheet fed printing system, the vehicle preferably contains about 45 to 55% resin, about 20 to 30% oil and about 20 to 30% solvent, whereas for a heat set printing system, the vehicle will contain less oil and more resin, e.g., about 50 to 60% resin, about 10 to 20% oil and about 25 to 35% solvent. The preferred basic vehicle system of the novel inks of this invention is a high viscosity oleoresinous vehicle comprising a high melting point, esterified, rosin modified, phenolic, gelled with an aluminum complexing agent. The phenolic is oiled out into either vegetable oils or long oil alkyds to solubilize the resin and let down with high boiling aliphatic hydrocarbons.

A particularly suitable non-gelled basic vehicle system for use in an ink designed for use in a sheet-fed system is supplied by Iovite Chemicals, Inc., as Iovite 2-108 and contains 40% of an esterified, rosin modified, phenolic resin, 6% of a 100% oil soluble, phenolic resin, 30% oil, 23% solvent and 1% of a bodying agent. A preferred gelled vehicle system, also supplied as Iovite 3-311-43, XP585 or 2-178, comprises about 16 to 20% bodied linseed oil, 11 to 15.5% long oil linseed alkyd, 32.5 to 37.5% bisphenol modified rosin ether, 29 to 33% Magie 535 oil and 1 to 2% aluminum isopropoxide. Preferred vehicles for use in ink designed for use in a heat-set printing system include Iovite 3-236 which is a pentaerithritol ester phenolic resin in isophthalic alkyd, gelled and dissolved in Magie 500 oil. This vehicle is a highly structured gel containing 62% solids which has a tack of 14 at 400 RPM.

Pigments suitable for use in the present invention include coloring agents such as inorganic and organic pigments which are usable in a planographic ink. Typical inorganic and organic pigments include diarylide yellow of the AAA, AAOA and AAOT type, phthalocyanide Blue GS, green shade beta type, permanent red 2B calcium, lithol rubine (4B), rhodamine YS, carbon black metal modified furnace type (with alkali blue toner) chrome yellow, iron blues, iron oxides, titanium dioxide, alumina hydrate, blanc fixe, calcium carbonate, lake pigments, PMTA colors, fluorescent pigments, metallic pigments, clays, naphthols, and other organic pigments.

The pigments are employed in vehicle-dispersable amounts. In general, it is desired to carry as much pigment in the ink as possible. A range of typical pigment amounts used would be approximately 12 to 50% by weight of the ink. A preferred manner of adding an organic pigment is as a flushed dispersion. This dispersion is prepared by treating a pigment press cake with the basic vehicle components which will preferentially flush out or eliminate the water from the pigment surface. The pigment loading of the dispersion is as high as possible and still permit ease of handling of the dispersion. Generally, about 30 to 45% of this dispersion will be pigment. A preferred vehicle for use in preparing the vehicle for use in an ink for a sheet-fed system is a 1:1:1 ratio of Iovite 2-108, Iovite I-110 and Iovite I-102. The use of a pigment dispersion has led to better flow characteristics and ease of handling on the press. Drying on the sheet is also faster. Further, ink performance at low temperatures, e.g., 70° F., is improved. A suitable vehicle for preparing a pigment flush for use in an ink designed for a heat-set system is a dimerized rosin ester such as Iovite 102 which is 53% Pentalyn K in Magie 535 oil and has 50 to 55% solids. Magie 500 oil can also be used.

The selected modifying varnish is basically added to adjust the rheological properties of the ink and, in general, sufficient amounts are added to provide the high viscosity, and internal cohesion and low yield value over the broad range of press operating conditions including temperatures ranging from room temperature to 104° or 125° F., and high shear rates resulting from high press speeds, e.g., up to 1000 fpm, or more. The flow control agent is basically added in an amount effective to provide the desired surface energy over the operating range of press conditions. The internal cohesion is sufficient to maintain wetting and transference of the ink to the image areas of a printing plate whereas the surface energy is sufficiently low that the ink does not wet the non-image areas of the printing plate within the plate operating range of temperatures. An ink designed for use in a sheet-fed system will desirably have a viscosity of above about 300 poise at 40° C. measured with a cone and plate type viscometer. The viscosity of the inks designed for use in a heat-set system is desired to be above 100 poise, typically in the range of about 125 to 175 poise, at 40° C. The ink viscosity measurements herein, unless otherwise stated, are made on a Haake viscometer at 40° C. using a PKII cone driven at a constant speed of 16 RPM representing a 318.4 sec$^{-1}$ shear rate. The initial peak is taken as the viscosity. The maximum viscosity suitable for the ink is that at which the ink will not move through the roller train when it is maintained at room temperature, e.g., 70° F., or about 700 poises. The desired viscosities of the inks of this invention are high in relation to the viscosities normal for conventional inks designed for use in other lithographic systems. Conventional lithographic inks for use in a sheet-fed system typically have a viscosity at 40° C. of about 90 to 100 poise and such inks for use in a heat-set system typically have a viscosity at 40° C. of 40 to 50 poise, or less. Sufficient modifying varnish is, therefore, incorporated into the ink vehicle to provide an ink having preferred rheological properties for the end use desired. An addition of the flow control agent, polyamide or gelling agent will tend to further increase the ink viscosity. Generally, the modifying varnish will comprise about 3 to 35% by weight of the ink system, although preferably it will be less than 20% by weight of the ink. The specific amount of modifying varnish used in a given ink will not only be determined by the basic vehicle system but also will be determined in part by the pigment used since the ink viscosity and flow is related to the specific basic vehicle-pigment relationships. The selected modifying varnishes also improve the performance of the ink system for both printing performance, e.g., transfer through the press and setting, and end use requirements, e.g., rub resistance.

A chemically gelled vehicle is preferred for the sheet-fed ink systems since it further improves the thermal stability of the basic vehicle-modifying varnish ink system and provides an ink having a low tack. A physical gelling agent can also be added to the ink system to improve the thermal stability of an ink made from a non-gelled basic vehicle. However, it is preferred to make the basic vehicle-modifying varnish system the control on stability. The modifying varnish, as well as the chemically-gelled vehicle, or a vehicle physically gelled with a gelling agent, change the response of the ink viscosity to temperature. Whereas, without use of modifying varnish and the chemically- or physically-gelled vehicle as a generalization, the ink viscosity changes about 10% for each 1° C. variation; the use of the modifying varnish, gelled vehicle or the gelling agent slows down this viscosity change. Further control of the viscosity, particularly when using a gelled vehicle, can be accomplished by incorporating a small, but sufficient amount of a polyamide, e.g., of the Versamid type, such as Versamid 2950, in the vehicle to increase the viscosity. Such polyamides are non-reactive condensation products of dimerized fatty acids and have amine values of about 3 to 8 and a softening point of about 90° to 100° C.

The selective modifying varnishes for use with the basic ink vehicle include cyclised rubber; dimerized rosin estrs; alkyds and rosin modified alkyds; esterified, rosin modified, phenolic oleoresinous gels; and hydrocarbon resin solutions. The modifying varnish, since it is changing the rheology of the basic vehicle, is different from the basic ink vehicle. A cyclised rubber of relatively low molecular weight, such as Alpex C8415 of American Hoescht Corp., is desirable to improve setting properties of the inks. The cyclised rubber is typically added as a solution in a high boiling aliphatic hydrocarbon solvent such as a Magie Oil and is preferred for use in gelled ink systems. Magie 470, a petroleum oil having 85% saturates, 10% aromatics and 5% olefins can be used. Dimerized rosin esters are esterification products of dimerized rosin and pentaerithritol and are commercially available, such as Iovite I-102 or 3-103 which is 53% Pentalyn K produced by Hercules, Inc., in Magie Oil 535. Iovite 3-105 is an example of a rosin modified alkyd suitable for use as a modifying varnish. This alkyd comprises 70% polyester resin, 30% tall oil and 0.03% aluminum isopropylate cut to 60% solids with Magie 535. The phenolic oleoresinous gel is a heat-set phenolic resin, as described above, gelled with a gelling agent, generally an aluminum complex such as aluminum isopropylate. A number of these gels are commercially available such as LV-322 of Lawter Chemicals Company. Lawter 931 is a suitable modifying varnish for use in combination with a Iovite 3-236 vehicle. Lawter 931 is a low structure modified pentaerithritol ester in alkyd comprising 67% solids in Magie 470; it has a tack of 20 at 400 RPM. Hydrocarbon resins, such as Nevchem 140 of Nevill Chemicals, melting above about 140° C. (Ball and Ring) are suitable. Resin solutions containing about 60% resin solids in a solvent such as Magie 535 are particularly suitable.

The flow control additives of this invention used with both the sheet-fed and heat-set ink systems are, advantageously, polysiloxanes, e.g., essentially linear polysiloxanes, having chemically reactive radicals which polysiloxanes are chemically-, or physically-, combined with organic surfactants, preferably polyether surfactants. The polysiloxanes generally have a viscosity ranging from about 25 to 150 centistokes at 25° C. and the chemically reactive radicals are generally a chain-terminating radical, e.g., radicals such as hydrogen; hydroxyl; —OR, where R can be lower alkyl, e.g., methyl or ethyl, or aryl, e.g., phenyl; or halogen, e.g., chloro; preferably hydroxyl or —OR radicals; but most preferably, a hydroxyl radical. One group of such polysiloxanes has the general formula

wherein X is the chemically reactive radical, R has the same meaning as set forth in the previous sentence and different R radicals can be the same or different, and n is from about 3 to 100. Preferably, R is methyl.

Polysiloxanes chemically-combined with surfactants include silicone polymers, e.g., resins including silicone block copolymers such as silicone alkylene block copolymers, silicone phenyl block copolymers, silicone chlorophenyl block copolymers and, preferably, silicone alkylene oxide block copolymers, which can contain differing polyalkylene oxide units, e.g., the alkylene oxide units including those having 2 to 4 carbon atoms, and further, the differing units can be connected by a suitable connecting (linking) organic functional group, e.g., carboxyl, alkylene, amine, ester or ether group. The preferred include silicone-polyether copolymers, e.g., silicone-ethylene oxide, silicone-propylene oxide, and silicone-ethylene oxide-propylene oxide copolymers. They can be terminated with an end-blocking radical, such as, for instance, a hydroxyl or a lower alkoxy, e.g., butoxy, radical.

It is convenient and advantageous to add these flow control materials (additives) as a 10 to 60% by weight solution in a hydrocarbon, preferably aromatic, solvent, e.g., xylene or toluene. These materials function to change the surface energy of the ink as well as increase the viscosity.

A chemically-, or physically-, combined group of preferred polyethers include polypropylene oxide polyethers and polyethylene oxide-polypropylene oxide polyethers having a wt. ratio of $C_2$ to $C_3$ ranging generally from about 1:1 to 1:12, preferably from about 1:1.2 to 1:10. A particular material suitable for use is S-30 of Union Carbide which is a silicone-polyether combination containing about 20 wt. percent dimethyl polysiloxane component and substantially the balance, polypropylene oxide component, incorporated as a 12 wt. percent solution in xylene.

Another material suitable for use is DC-11 of Dow Corning which is a toluene solution of a silicone-polyether combination containing ethylene oxide and propylene oxide units in a wt. ratio of $C_2$ to $C_3$ of about 43:57. Another example of such a silicone-polyether has the structure

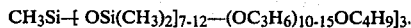

$CH_3Si$–$[OSi(CH_3)_2]_{7-12}$–$(OC_3H_6)_{10-15}OC_4H_9]_3$.

An amount of the flow control additive is used which is sufficient to increase the toning temperature of the ink to a temperature at which the toning does not occur in the printing operation. The minimum amount of addition is that required to provide an ink which does not become Newtonian, i.e., reach its toning temperature, at temperatures at or below the printing plate temperature. Preferably, the toning temperature is at least 5° F. above the expected plate temperature. Since plate temperatures of 90° F. to 125° F., or higher, are to be expected in Driography, inks having toning temperatures of 85° to 125° F., preferably 140° F., are desired. Obviously, for operations during the winter and in air-conditioned facilities, a lower toning temperature can be tolerated than during the summer, or in non-air-conditioned facilities. In general, the flow control additive will comprise about 0.25 to 1.5%, or 2% by weight of the ink. The amount of flow control additive preferably used is about 0.50 to 1%, by weight of the ink. A higher amount has no apparent increased effect, although it does not hurt the ink unless the amount added begins to act as a diluent and reduces the effectiveness of the overall ink system.

Complexing or chemical-gelling agents suitable for use in this invention to chemically gel the preferred basic vehicle include metallo-organo chelating compounds, e.g., the aluminum alkoxylates such as the commercially available methoxylated, ethoxylated and butoxylated aluminum derivatives. Aluminum octoate can be used. Aluminum isopropoxide is particularly suitable. The complexing agent is rapidly and thoroughly dispersed in the basic vehicle system under heat, e.g., 350° to 450° F., in an amount sufficient to produce the desired increased viscosity. Amounts of about 1 to 5% by weight of the basic vehicle, preferably about 1 to 3%, are suitable. If desired, dispersion of the complexing agent can be aided by incorporating it in the vehicle using a carrier such as the solvent in the vehicle. In contrast to use of a gelling agent in the non-gelled basic vehicle ink system, the complexing agent complexes the resin in the vehicle rather than physically gelling the ink system.

A polyamide, as described above, can also be used with the complexing agent to increase the viscosity of the ink prepared from a gelled basic vehicle. Its action is a physical effect and the polyamide is added in an amount effective to increase the viscosity the desired amount. In general, the polyamide is used in amounts of about 1 to 3% by weight of the basic vehicle. The use of about 2% polyamide and an ink system having a viscosity of about 300 poise at 40° C. will increase the viscosity to about 450 poise.

Physical-gelling agents for thermally stabilizing the inks of this invention prepared from non-gelled vehicles include clay gellants such as montmorillonite clay gellants and Bentone 38 gellant, an organically modified montmorillonite; fumed silica gellants, particularly the fumed, colloidal, amorphous silica gellants having particles of submicroscopic size, i.e., surface area of 200 to 400 square meters per gram, such as Cab-O-Sil M-5 and M-7 which are made by vapor phase hydrolysis of silicon tetrachloride; and aluminum gelling agents such as aluminum stearate or aluminum isopropylate. The gelling agent is added in an amount sufficient to provide the ink with the desired thermal stability, i.e., with a toning temperature above that desired, and in the range of 85° F. to 125° F., or 140° F., or higher. If too much gelling agent is included in the ink, however, the viscosity of the ink will be increased too much, i.e., to above 700 poise at 70° F., and the ink will not move through the press. If too little gelling agent is used, it has no effect on the ink. Approximately 1 to 4%, preferably 1 to 2% by weight, of the ink will generally be gelling agent.

A consequence of obtaining the high viscosity of the inks of this invention, however, is that the ink also has a high tack. The high tack of both the sheet-fed and web ink systems is masked by the addition of an organo-silicone oil which lowers the surface energy of the ink but also masks the tack. An effective tack masking, organo-silicone oil in effective amounts is used, frequently and advantageously in combination with solvent, e.g., a gelled solvent, hydrocarbon solvent or vegetable oil. If, however, too much of this tack masking agent is included in the ink, syneresis will occur and the ink will not transfer through the roller train and to the printing plate. In general, approximately 0.5 to 2% by weight, preferably about 1 to 2%, of the tack masking agent is used in the inks of this invention. Low molecular weight, low viscosity, dimethyl polysiloxanes, i.e., of 10 to 100 centistokes, have been used in Driographic inks heretofore to achieve image/non-image contrast, but up to now larger amounts, e.g., over 5% by weight, have been necessary and have given side effects such as syneresis both in the stressed and unstressed state. This manifests itself, with respect to the ink, in a failure of the ink to transfer through the roller train and refusal to trap on overprinting. By using smaller amounts, generally below 2% by weight, of a higher molecular weight and viscosity dimethyl polysiloxane, which is compatible in the inks of this invention, these side effects do not occur.

Organo-silicone oils usable as tack maskers in the novel inks of the present invention are water-insoluble, substantially non-volatile, liquid polysiloxanes having a viscosity greater than 200 centistokes at 25° C. and any of the commonly known compounds of this type which are compatible with, not deleterious to, and provide tack-masking properties in, the novel inks can be used. Essentially linear polysiloxanes wherein the organic radical is a low molecular weight aliphatic group, e.g., lower alkyl such as methyl or ethyl, or wherein a high percentage of low molecular weight aliphatic groups are present, are preferred. The particularly preferred polysiloxanes are end-blocked with chemically non-reactive radicals, for instance, with organic radicals such as trialkyl, e.g., trimethyl, radicals. Others include aryl, e.g., phenyl and substituted (e.g., chloro-substituted) phenyls, and alkyl-aryl, e.g., methyl-phenyl, silicone oils. The organo-silicone oils employed generally have a viscosity from about 200 to 600, preferably 200 to 500, centistokes at 25° C. An intermediate molecular weight, intermediate viscosity, dimethylpolysiloxane is particularly preferred. The materials sold by Union Carbide as L-45 silicone fluids and Dow Corning DC-200 are suitable for use in the present invention. These materials are available in a range of standard viscosities. A material with a viscosity of about 350 centistokes, or slightly higher, e.g., up to about 500 centistokes as measured on a U-tube capillary viscometer, is particularly appropriate. A gelled basic vehicle is preferred because the tack of the ink system prepared from this vehicle is generally less than the tack of an ink system prepared from the non-gelled vehicle.

The tack is also advantageously controlled by the inclusion of a tack reducer such as a solvent, e.g., Magie 470 oil, Magie 500 oil, gelled Magie 470, etc. Vegetable oil, e.g. tung oil, or a very low viscosity, long oil linseed alkyd, such as Lawter Solvar, are suitable tack reducers for use in a sheet-fed system. Amounts from about 5 to 10%, preferably 5 to 8% by weight of the ink are typical for the tack reducer. The linseed alkyd will generally have a viscosity of 0.75 to 1 poise, or less. In general, it is desired that the tack of the ink be below about 20, preferably below 16, as measured on an Inkometer at 1200 RPM and 90° F. over 1 minute and the tack masking agent and tack reducer are advantageously added in combination in amounts selected to reduce the tack and meet this objective. For instance, the use of tack reducers generally involve a solvent-type action which, while reducing tack, also tend to reduce viscosity, and the tack masker, a non-solvent type, effects a lowering of tack without deleteriously reducing viscosity. Accordingly, the combination is particularly advantageous in lowering tack with a minimum, if any, lowering of viscosity.

Additives which are added to the basic vehicle system, conventional in the art, include wax compounds, driers, and anti-oxidants. Th wax compound, or combinations of wax compounds, provide slip and rub resistance. Printing ink grade polyethylene such as AC-6 of Allied Chemicals Co., or Epolene N-10 of Eastman Chemical Co. and waxes commercially available may be used in the present invention. The polyethylene wax is of a low density, medium crystallinity and the form sold as a dispersion, such as Iovite XP107 or Lawter 697, in an alkyd resin is suitable for use in a sheet-fed ink whereas the form sold in 440 Magie oil is suitable for use in a heat-set ink system. The Fisher Tropsch (FT) waxes, generally available in aliphatic hydrocarbon solvents, such as Texolon of Lawter Chemicals Company, are also suitable. Generally, less than about 10% by weight, preferably less than about 8% of the wax compound is used in the ink because it reduces the ink viscosity and gloss. Th drier can be one of the commercially available cobalt/manganese combinations. A number of cobalt/manganese driers are commercially available as cobalt/manganese linoleate, hexadeconate or octoate. Lin-all printing ink drier of Mooney Chemicals is a suitable drier. HEX-CEM lead-free drier of Mooney is also suitable. Any conventional antioxidant that will not react in the ink system may be used. Specific examples would include the commercially available butylated hydroxy toluene, Eugenol, and Bartyl. Also, greases can be used to improve transfer of the ink through the press. Orange solid oil, a common printing ink grease, is suitable.

Typical ink formulations in accordance with this invention using an organic pigment would be as follows (percent by weight):

|  | General | | Preferred | |
| --- | --- | --- | --- | --- |
| organic pigment | 10–18% | 10–18% | 12–18% | 12–18% |
| non-gelled vehicle | 25–60% | — | 35–50% | — |
| gelled vehicle | — | 40–55% | — | 45–50% |
| modifying varnish | 3–35% | 5–25% | 3–20% | 5–20% |
| gelling agent | 1–4% | — | 1–2% | — |
| wax compound | 5–10% | 5–10% | 5–8% | 5–8% |
| reducer | 5–10% | 4–10% | 5–8% | 4–8% |
| flow control agent (50% solution) | 0.5–3% | 0.5–3% | 1–2% | 1–2% |
| tack masking agent | 0.5–2% | 0.5–2% | 1–2% | 1–2% |
| drier | 0.5–2.5% | 0.5–2.5% | 0.5–1.5% | 0.5–1.5% |
| antioxidant | 0.25–0.5% | 0.25–0.5% | 0.25–0.5% | 0.5–1.5% |
| grease | 0–3% | 0–3% | 0–3% | 0–3% |
| solvent | 0–4% | 0–4% | 0–4% | 0–4% |

When a black pigment is used, a blue toner is desirable and it replaces a portion of the vehicle. Also, in using a pigment flush, a substantial portion of the vehicle is first used to prepare this dispersion. Furthermore, formulations using inorganic pigments, because of their high specific gravity, will be used at higher pigment loadings with the necessary reduction in vehicle component. The use of grease and solvent is particularly desirable in a heat-set ink system and with such a system the drier and antioxidant may be omitted in many applications.

The invention may be further illustrated by the following examples:

EXAMPLE I

The following materials were used in the requisite amounts by weight to produce inks of the colors described in Table I. Materials 7 to 10 were separately weighed and mixed. Materials 1 to 6 were weighed and milled. The two parts were combined and given a canning pass. The ink had a uniform consistency and a particle size of less than 2 as measured by NPIRI Grindometer. The viscosities were 800 to 900 poise at 70° F. as measured by Laray viscometer.

TABLE I

| | Color | | | |
|---|---|---|---|---|
| Ingredient | (a)Yellow | (b)Red | (c)Blue | (d)Black |
| (1) Vehicle (Iovite 2-108) | 52.0% | 53.0% | 53.0% | 44.0% |
| (2) Varnish (Iovite 3-103) | 12.0 | 12.0 | 12.0 | 12.0 |
| (3) Printing Ink Grade Polyethylene (45% in alkyd) (Iovite CW-56M) | 8.0 | 8.0 | 8.0 | 8.0 |
| (4) Pigment* | 14.0 | 14.0 | 14.0 | 14.0 |
| (5) Alkali blue toner,(e) | — | — | — | 8.0 |
| (6) Tung oil | 8.0 | 7.0 | 7.0 | 8.0 |
| (7) Dimethylpolysiloxane Union Carbide, L-45, (350 centistokes) | 1.5 | 1.5 | 1.5 | 1.5 |
| (8) Flow Control Additive (S-30) | 2.0 | 2.0 | 2.0 | 2.0 |
| (9) Drier (2.8% cobalt, 3% manganese) | 2.0 | 2.0 | 2.0 | 2.0 |
| (10) Butylated hydroxy toluene (extended in alkyd) | 0.5 | 0.5 | 0.5 | 0.5 |
| | 100.0% | 100.0% | 100.0% | 100.0% |
| Tack** | 20-22 | 20-22 | 21-23 | 20-22 |

*Pigment
(a)dry yellow - diarylide yellow AAA (Y B-1, Harman Color)
(b)Permanent Red 2-B (20-6470, American Cyanamid)
(c)Phthalocycine blue GS (55-3297, American Cyanamid)
(d)Carbon black metal modified furnace type (Peerless 155, Columbia Carbon)
(e)Alkali blue toner (8-5B-100, Chemetron)
**Inkometer, 1200 RPM at 90° F. over 1 minute The ink was run with 3 M driographic plates, described in U.S. Pat. No. 3,511,178, supra, in a Driography process using a 4 color, sheet-fed 38 inch, Miller Press. No toning occurred during the printing run. An infrared sensor was used to monitor press temperatures. Running temperatures of the press were determined to be black, 91° F.; yellow, 90° F.; red, 100° F.; and blue, 91° to 94° F. No toning occurred. The black was subsequently found to have a toning temperature of 97° F. on a different press. The drying and skinning rates were 4 hours on an open press. The tack equates with the wet offset process.

Acceptable color copies were made with a composite form with 5 varied process subjects, standard GATF color bars and stars on center sheet, full GATF color blocks, a set of multi-screen, multi blocks and a set of 0-100/single screen bars. Four papers were used: Mountie offset smooth 80#, Mountie Vellum, Shasta suede and letterpress gloss coated. The sequence of printing was blue, red, yellow and black.

The setting rate and drying speed on the paper were:

| | Setting | Drying |
|---|---|---|
| Mountie offset smooth, Mountie vellum, | some setoff, slower than | overnight |
| Shasta suede, Letterpress gloss coated, | conventional equal to conventional | 4-6 hours |

Trapping was good on all colors and the print quality and lay were acceptable. The rub resistance was acceptable.

EXAMPLE II

Four inks were run in a Driography process using a 4 color, sheet-fed 38 inch Harris press. The plates consisted of book covers printed on Kromecote and Ballantine coated coverstocks. Table II sets forth the requisite amounts by weight of materials used to formulate the inks. Acceptable copies were made with all colors. The setting rate was instantaneous on the Kromecote and good on the Ballantine coverstock. The drying speed was 2 to 4 hours and skinning rate 2 to 4 hours (blue 2). Trapping was good and print quality and lay were acceptable. The black gave some mottle. All covers spirit lacquered without problem. The plate temperatures when running these inks were:
  yellow, 97° F.
  red, 98° F.
  blue, 98° F.
  black, 90° F.

TABLE II

| | Color | | | |
|---|---|---|---|---|
| Ingredient | Yellow | Red | Blue | Black |
| Vehicle (Iovite 2-108) | 49.5% | 52.0% | 51.5% | 45.0% |
| Varnish (Iovite 3-103) | 14.0 | 14.0 | 14.0 | 12.0 |
| Polyethylene - printing ink grade (45% in alkyd) (Iovite CN-56M) | 4.0 | 4.0 | 4.0 | 4.0 |
| 40% FT Wax in Magie 500 oil (Lawter LV-1405) | 4.0 | 4.0 | 4.0 | 4.0 |
| Pigment* | 16.0 | 14.0 | 14.0 | 14.0 |
| Alkali blue toner | — | — | — | — |
| Tung oil | 8.0 | 7.0 | 8.0 | 8.0 |
| Dimethylpolysiloxanes (L-45, 350 centistokes) | 1.5 | 1.5 | 1.5 | 1.5 |
| Flow control additive*** | 2.0 | 2.0 | 2.0 | 2.0 |
| Drier (2.8% colbalt, 3.0% manganese) | 0.25 | 1.0 | 0.25 | 1.0 |
| Butylated hydroxy toluene extended in alkyl | 0.75 | 0.5 | 0.75 | 0.5 |
| | 100.0% | 100.0% | 100.0% | 100.0% |
| Tack** | 21-22 | 21-22 | 21-22 | 21-22 |

*See Table I
**See Table I
***Same as Example I

EXAMPLE III

An ink of the following formulation was prepared:

TABLE III

| Vehicle (Iovite 2-108) | 40.0%* |
|---|---|
| Varnish | 13.5 |
| Polyethylene - printing ink grade 45% in alkyd (Iovite CN-56M) | 4.0 |
| 40% FT Wax in Magie 500 Oil (Lawter LV-1405) | 4.0 |
| Pigment | 16.0 |
| Alkali blue toner | 10.0 |
| Gelling agent | 1.0* |
| Tung oil | 7.0 |
| Dimethylpolysiloxane (L-45, 350 centistokes) | 1.5 |
| Flow Control Additive** | 2.0 |

TABLE III-continued

| | |
|---|---|
| Drier (2.8% cobalt, 3.0% manganese) | 0.5 |
| Butylated hydroxy toluene extended in alkyd | 0.5 |

*The amount 108) gelling agent was varied and the amount of Vehicle adjusted when more, or less, than 1% gelling agent was used.

**Same as Example I.

The pigment was furnace black. The modifying varnish was cyclised rubber, Alpex C8415, added as a solution in Magie 470 oil which contained 53% solids. Two gelling agents, Bentone 38 and Cab-O-Sil M-5, were used to prepare a number of inks and the inks were successfully printed using the Driography process in a sheet-fed system. Table IV sets forth the amount of gelling agent used in the inks together with the toning temperature and tack of the ink. The viscosity of the inks were 1000 to 1100 poise at 70° F.

TABLE IV

| | Gelling Agent | | | | | | |
|---|---|---|---|---|---|---|---|
| | Bentone 38 | | | | Cab-O-Sil M-5 | | |
| | ½% | 1% | 1½% | 2% | 1% | 2% | 3% |
| Toning (°F.) | 105 | 115 | 104 | 108 | 100 | 110 | 108 |
| Tack* | 20.2 | 21.2 | 6.6 | 15.2 | 21.8 | 21.4 | 17.9 |

*See Table I

Additional inks containing, respectively, 1% Bentone 38 and 2% Cab-O-Sil M-5 were prepared substituting for the black pigment and blue toner, 16% of a pigment listed in Table I and 10% vehicle. The toning temperature and tack of these inks were:

| | Bentone 38 | | Cab-O-Sil M-5 | |
|---|---|---|---|---|
| | Toning (°F.) | Tack | Toning (°F.) | Tack |
| Yellow | 107 | 20.5 | 107 | 22 |
| Red | 104 | 17.5–20.5 | 101 | 15.8–20 |
| Blue | 98 | 21.4 | 96 | 21.7 |

EXAMPLE IV

A blue ink was prepared as described in Example I as follows:

| | |
|---|---|
| Vehicle (Iovite 2-108) | 36% (by weight) |
| Varnish (Iovite 3-105) | 35 |
| Polyethylene (Iovite CN-) | 5 |
| Phthalocyanine Blue GS | 10 |
| Tung oil | 7 |
| S-30 | 3 |
| L-45 (350 centistokes) | 1 |
| Drier (2.8% cobalt/3.0% manganese) | 2 |
| | 100% |

This ink printed successfully in a sheet-fed system and had a toning temperature of 121° F. The tack was 21–22 on the Inkometer at 1200 RPM and 90° F. over 1 minute and the viscosity was about 1000 at 70° F.

EXAMPLE V

The ink of Example III, replacing the gelling agent with additional vehicle successfully printed and had a toning temperature of 85° F.

EXAMPLE VI

Inks having the formulae set forth in Table V in percent by weight were prepared and successfully used in sheet-fed press runs using the Driographic plate and process. The viscosity, tack and toning temperature are stated. The toning temperature is the plate surface temperature measured by a contact pyrometer. The press was a water-cooled temperature-controlled ATF Chief press.

The modifying varnish was a solution comprising 52% Alpex C8415 cyclised rubber, 2% Tridecanol and 46% Magie 470. The basic vehicle was the same except that in one vehicle 1.5% polyamide (Versamid 2950) was added after gelling. The basic vehicle comprised 16 to 20% bodied linseed oil, 11 to 15.5% long oil linseed alkyd, 32.5 to 37.5% bisphenol modified rosin ester, 29 to 33% Magie 535 oil gelled with about 1% aluminum isopropoxide and 1 to 3% aluminum octcate at 350° to 450° F.

TABLE V

| | (1) Yellow | (2) Yellow | (3) Blue | (4) Black | (5) Red | (6) Red | (7) Blue | (8) Black |
|---|---|---|---|---|---|---|---|---|
| Basic vehicle | 50.0 | 55.25 | 55.0 | 40.0 | — | — | 55.0 | 41.25 |
| Basic vehicle (with polyamide) | — | — | — | — | 53.5 | 52.5 | — | — |
| Modifying varnish | 14.25 | 16.0 | 14.0 | 13.0 | 16.0 | 10.0 | 14.0 | 15.0 |
| #6 linseed alkyd | 5.0 | — | 3.0 | 3.0 | — | 6.0 | — | — |
| Polyethylene wax (Lawter LV563) | 8.0 | 8.0 | — | 8.0 | 8.0 | 8.0 | — | 8.0 |
| FT wax (Lawter FT300) | — | — | 4.0 | — | — | — | 4.0 | — |
| Dry yellow* | 16.0 | 16.0 | — | — | — | — | — | — |
| Dry red | — | — | — | — | 18.0 | 18.0 | — | — |
| Dry blue | — | — | 16.0 | — | — | — | 16.0 | — |
| Dry white | — | — | 3.0 | 3.0 | — | 1.0 | 3.0 | 3.0 |
| Dry black | — | — | — | 18.0 | — | — | — | 18.0 |
| Blue toner base | — | — | — | 10.0 | — | — | — | 10.0 |
| Solvent (Magie 470) | 2.0 | — | — | — | — | — | — | — |
| Oil Dimethyl- | — | — | — | — | — | — | 3.0 | — |

*The pigments used are described in Example I.

TABLE V-continued

|  | (1) Yellow | (2) Yellow | (3) Blue | (4) Black | (5) Red | (6) Red | (7) Blue | (8) Black |
|---|---|---|---|---|---|---|---|---|
| polysiloxane (L45) | 1.5 | 1.5 | 1.5 | 1.5 | 1.5 | 1.5 | 1.5 | 1.5 |
| Flow control additive* | 2.0 | 2.0 | 2.0 | 2.0 | 2.0 | 2.0 | 2.0 | 2.0 |
| Butylated hydroxytoluene | 0.5 | 0.5 | 0.5 | 0.5 | 0.5 | 0.5 | 0.5 | 0.5 |
| Drier (2.8% Co, 3 Mn) | 0.75 | 0.75 | 0.75 | — | 0.5 | 0.75 | 0.75 | 0.75 |
| Drier (6% Co linoleate | — | — | — | 1.0 | — | — | — | — |
| Viscosity (p)** | 373 | 475 | 482 | 491 | 361 | 471 | 271 | 442.5 |
| Tack (IR ± 0.5) | 17.5 | 17.5 | 14.0 | 17.5 | 17.5 | 16.0 | 17.5 | 17.5 |
| Toning temperature (°F.) | 118 | 118 | 115 | 110 | 100 | 104 | 100 | 106 |

*Flow control additive a 27% solution in toluene of the additive described in Example I.
**at 40° C.

EXAMPLE VII

Inks were prepared according to the formulae of Table VI in percent by weight and successfully printed in a sheet-fed system. The basic vehicle was the same as Example VI except that the gelling was accomplished with about 1 to 2% aluminum isopropoxide at 350° to 450° F. and no polyamide was included. The modifying varnish was the same as in Example VI.

TABLE VI

|  | Red | Blue | Yellow | Black |
|---|---|---|---|---|
| Basic vehicle | 53.25 | 53.25 | 49.25 | 42.00 |
| Modifying varnish | 10.00 | 14.00 | 14.00 | 12.00 |
| #6 linseed alkyd (Modifying Varnish) | 6.00 | 3.00 | 7.00 | 5.00 |
| Polyethylene wax (LV563) | 8.00 | 8.00 | 8.00 | 8.00 |
| Solvent (gelled Magie 470) | 2.00 | 1.00 | 3.00 | — |
| Dry yellow | — | — | 14.00 | — |
| Dry red | 16.00 | — | — | — |
| Dry blue | — | 16.00 | — | — |
| Dry black | — | — | — | 18.00 |
| Blue toner base | — | — | — | 10.00 |
| Dimethylpolysiloxane (L45) | 1.00 | 1.00 | 1.00 | 1.00 |
| Flow control additive (same as Example VI) | 2.00 | 2.00 | 2.00 | 2.00 |
| Butylated hydroxytoluene | 0.50 | 0.50 | 0.50 | 0.50 |
| Drier (2.8% Co, 3 Mn) | 0.75 | 0.75 | 0.75 | 1.00 |
| Mn feeder drier (hexcemLFD) | 0.50 | 0.50 | 0.50 | 0.50 |
| Viscosity (p)* | 350 | 345 | 431 | 352 |
| Tack (IR ± 0.5) | 16.00 | 16.00 | 14.50 | 18.50 |
| Toning temperature (°F.) | 115 | 114 | 114 | 110 |

*At 40° C. Haake PK II

EXAMPLE VIII 50 lbs. of each ink formula set forth in Table VII in percent by weight were made and printed in a sheet-fed Miller 38 inch system. No problems in running, drying or back-up were experienced in a 37,000 copy run in four colors. The color pigments used were prepared from pigment flushes using a vehicle comprising equal parts of Iovite 2-108, I-110 and I-102. The pigments were:

| Pigment |  | % Pigment in Pigment Flush |
|---|---|---|
| yellow | AAA diarylide | 30 |
| red | lithol rubine | 36 |
| blue | phthalo blue GS | 33 |

The remaining 0.250 percent of the yellow ink was an orange based used to adjust the color.

Runs of 6,000 to 67,000 impressions were also successfully made with inks of the formulae set forth in Table VII using a four-color Harris 38 inch system.

TABLE VII

|  | Color | | | |
|---|---|---|---|---|
|  | Yellow | Red | Blue | Black |
| Iovite XP585 | 33.25 | 33.5 | 35.5 | 40.5 |
| Modifying Varnish (same as Example VI) | 5.0 | 5.0 | 5.0 | 6.0 |
| Modifying Varnish (Iovite I-112) | — | — | — | 6.0 |
| Polyethylene Wax (Lawter LV563) | 6.0 | 8.0 | 6.0 | 8.0 |
| Pigment base | 46.0 | 46.0 | 46.0 | — |
| Furnace black | — | — | — | 16.0 |
| Blue toner | — | — | — | 10.0 |
| FT Wax (Lawter FT300) | 2.0 | 2.0 | 2.0 | 2.0 |
| Dimethylpolysiloxane (L45) | 1.0 | 1.0 | 1.0 | 1.0 |
| Flow Control Additive (DC11, 27% in toluene) | 2.0 | 2.0 | 2.0 | 2.0 |
| Orange Solid oil (Famous Lubricants, 1-S) | 2.0 | — | — | 4.0 |
| Drier (HEX-CEM LFD) | 0.5 | 0.5 | 0.5 | 0.5 |
| Butylated hydroxytoluene | 0.5 | 0.5 | 0.5 | 0.5 |
| Drier (2.8% Co, 3% Mn) | 1.5 | 1.5 | 1.5 | 1.5 |
| Viscosity (p)* | 300 | 325 | 305 | 346 |
| Tack (IR + 0.5 at 800 RPM) | 16.0 | 17.5 | 15.7 | 16.5 |
| Toning Temp. (°F.) | 112 | 110 | 107 | 100 |

*at 40° C.

EXAMPLE IX

Inks of the formulae set forth in Table VIII in percent by weight were successfully printed in a heat-set press, Hantscho MKII blanket to blanket press in which the compressible blankets were replaced with a soft top conventional type. The drying was at 675 FPM at 425° F. in an Offenaire drier.

The pigment flushes used were:

|  | Pigment | Vehicle | % Pigment in Flush |
|---|---|---|---|
| yellow | AAA diarylide | 53% Pentalyn K in Magie 500 Oil | 28 |
| red | lithol rubine | 53% Pentalyn K in Magie 535 Oil | 33 |
| blue | phthalo blue GS | 53% Pentalyn K in Magie 500 Oil | 33 |

TABLE VIII

|  | Color | | | |
|---|---|---|---|---|
|  | Yellow | Red | Blue | Black |
| Vehicle (Iovite 3-236) | 28.5 | 30.25 | 35.25 | 33.25 |
| Modifying Varnish (Lawter 931) | 10.0 | 8.0 | 5.0 | 27.0 |
| Polyethylene Wax (Iovite XP107) | 6.0 | 6.0 | 6.0 | 6.0 |
| FT Wax (Lawter LV1405)* | 4.0 | 4.0 | 2.0** | 2.0** |
| Pigment | 46.0 | 46.0 | 46.0 | 16.0 |
| Blue toner | — | — | — | 8.0 |
| Dimethyl Polysiloxane (L45) | 1.0 | 1.0 | 1.0 | 1.0 |
| Flow Control Additive (DC11) | 2.0 | 2.0 | 2.0 | 2.0 |
| Orange Solid Oil (1-S) | 2.0 | 2.0 | 2.0 | 2.0 |
| Drier (2.8% Co, 3% Mn) | 0.5 | 0.5 | 0.5 | 0.5 |
| Butylated hydroxy toluene | 0.250 | 0.25 | 0.25 | 0.25 |
| Solvent*** | — | — | — | 2.0 |
| Viscosity (p)**** | 120–140 | 120–140 | 130–150 | 130–150 |
| Tack (IR ± 0.5) | 17.5 | 15.5 | 17.5 | 16.0 |

*Lawter LV1405
**Lawter Texalon
***Magie 500
****at 40° C.

EXAMPLE X

The ink is essentially the same as the ink set forth in Example I, except that instead of the flow control additive set forth in Example I, the flow control additive is composed of a polysiloxane of the formula

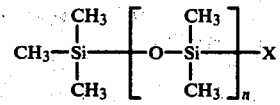

where X is hydroxyl and n is 50, and the polysiloxane is physically combined with a polyether having a wt. ratio of ethylene oxide to propylene oxide units of about 1:9.

EXAMPLE XI

The ink is essentially the same as the ink of Example X except that the polysiloxane is chemically combined with a polyether having a wt. ratio of ethylene oxide to propylene oxide units of about 1:1.4.

EXAMPLES XII–XVI

The inks are essentially the same as the ink of Example XI except that the chemically reactive group (X) of the polysiloxane is as indicated for the respective example:

| Example | X |
|---|---|
| XII | hydrogen |
| XIII | —O methyl |
| XIV | —O phenyl |
| XV | chloro |
| XVI | —O butyl |

Planographic printing plates particularly suitable for use with the novel inks of the present invention include those described in U.S. Pat. No. 3,511,178, supra, herein incorporated by reference. They include those which are imaged with an image which is oleophilic and oleo ink-receptive when dry, and when so imaged, and in the absence of dampening, suitable for accepting oleo-ink only in the image areas and printing therefrom, while rejecting the oleo ink in the non-image areas, comprising a backing having bonded thereover a highly adhesive layer adapted to form the non-image areas which is oleo ink repellent when dry, characterized by an adhesive release value when dry of less than about 100 grams per inch. The plate can be pre-sensitized and capable of being imaged by light exposure through a photographic transparency and development.

The abhesive layer can comprise a cured, solid, essentially linear elastomeric organopolysiloxane, for instance, one having a ratio of organo groups to silicone atoms of about 1.95 to 2.1.

A light-sensitive material having one solubility state in relation to aqueous media before exposure to light and another solubility state, in relation to aqueous media after exposure to light and being soluble in one of said states and insoluble in its other state, can be placed over and in contact with the backing with the highly abhesive layer overlying the light-sensitive material and being firmly bonded to the underlying layer when the latter is in its insoluble state.

The light-sensitive material is a light-sensitive diazo resin characterized in being water-soluble in its light-sensitive state, and becoming water-insoluble in its light-exposed state. It can be an insoluble light-sensitive polycomplex oxygenated anion diazonium salt characterized in that it is insoluble prior to light exposure, and upon light exposure is decomposed and readily washed away. An in situ formed decomposed diazo primer can be interposed between the light-sensitive material and the overlying highly abhesive surface layer.

An imaged planographic printing plate suitable for printing in the absence of dampening, and upon being rolled with oleo-ink on a printing press, of accepting said ink only in the image areas and printing therefrom, while rejecting the ink in the non-image areas, can advantageously comprise a backing having thereover an essentially planar surface, the portion of said surface in the image areas being oleophilic and oleo ink-receptive when dry, the non-image portions of said surface being highly abhesive and oleo ink repellent when dry. The non-image portions can comprise a cured, solid, linear silicone elastomer characterized by an adhesive release value when dry of less than about 100 grams per inch and the image areas can comprise a radiation modified, cured, solid silicone elastomer having an adhesive release value when dry greater than about 100 grams per inch.

It is claimed:
1. A planographic printing process employing a planographic plate having image and non-image areas comprising applying a planographic printing ink to said areas to provide for acceptance of the ink by an image area and rejection of the ink by a non-image area, said planographic printing ink being thermally stable at temperatures of about 85° F. to 140° F. and comprising (a) pigment dispersed in a planographic ink vehicle; (b) a modifying varnish in an amount sufficient to provide an ink having a yield value below about 5000 dynes/cm$^2$ and a viscosity above 100 poise at 40° C. with high internal cohesion, the modifying varnish being selected from the group consisting of cyclised rubber, dimerized rosin esters, alkyds, rosin modified alkyds, esterified rosin modified oleoresinous gells, and hydrocarbon resin solutions; and (c) a silicone polymer, flow control additive in an amount sufficient to increase the temperature, at which the ink becomes pseudoplastic, to at least 85° F. and provide an ink having a low surface energy; said internal cohesion being sufficient to maintain wetting and transference of the ink to the image areas of a printing plate whereas said surface energy is sufficiently low to avoid wetting, by the ink, of the non-image areas of the printing plate within the operating temperatures of the plate.

2. A printing process employing a planographic plate having image and non-image areas and a blanket cylinder to contact the plate and receive ink-image from the image area and transfer ink-image to a copy sheet comprising applying a planographic printing ink to the plate to provide for acceptance of the ink by an image area and rejection of the ink by a non-image area, contacting the plate with the blanket roller to receive ink-image from the image area, and transferring ink-image to a copy sheet to produce a printing, said planographic printing ink being thermally stable at temperatures of about 85° F. to 140° F. and comprising (a) pigment dispersed in a planographic ink vehicle; (b) a modifying varnish in an amount sufficient to provide an ink having a yield value below about 5000 dynes/cm$^2$ and a viscosity above 100 poise at 40° C. with high internal cohesion, the modifying varnish being selected from the group consisting of cyclised rubber, dimerized rosin esters, alkyds, rosin modified alkyds, esterified rosin modified oleoresinous gells, and hydrocarbon resin solutions; and (c) a silicone polymer, flow control additive in an amount sufficient to increase the temperature, at which the ink becomes pseudoplastic, to at least 85° F. and provide an ink having a low surface energy; said internal cohesion being sufficient to maintain wetting and transference of the ink to the image areas of a printing plate whereas said surface energy is sufficiently low to avoid wetting, by the ink, of the non-image areas of the printing plate within the operating temperatures of the plate.

3. The process of claim 2 wherein the ink is an oleo ink; the planographic plate is suitable for printing in the absence of dampening; and the plate comprises a backing having thereover an essentially planar surface, the portion of said surface in the image area being oleophilic and also ink-receptive when dry, the non-image portions of said surface being highly abhesive and also ink-repellent when dry.

4. A process of printing planographically comprising rolling the surface of a planographic plate with a planographic printing ink in the absence of dampeners, and contact-transferring the ink in areas accepted by said plate successively to copy sheets, the surface of said plate in the image areas being oleophilic and oleo ink-receptive when dry, the non-image portions thereof being highly adhesive and oleo ink-repellent when dry, and characterized by and adhesive release value when dry of less than about 100 grams per inch, said planographic printing ink being thermally stable at temperatures of about 85° F. to 140° F. and comprising (a) pigment dispersed in a planographic ink vehicle; (b) a modifying varnish in an amount sufficient to provide an ink having a yield value below about 5000 dynes/cm$^2$ and a viscosity above 100 poise at 40° C. with high internal cohesion, the modifying varnish being selected from the group consisting of cyclised rubber, dimerized rosin esters, alkyds, rosin modified alkyds, esterified rosin modified oleoresinous gells, and hydrocarbon resin solutions; and (c) a silicone polymer, flow control additive in an amount sufficient to increase the temperature, at which the ink becomes pseudoplastic, to at least 85° F. and provide an ink having a low surface energy; said internal cohesion being sufficient to maintain wetting and transference of the ink to the image areas of a printing plate whereas said surface energy is sufficiently low to avoid wetting, by the ink, of the non-image areas of the printing plate within the operating temperatures of the plate.

5. The process of claim 4 conducted on an offset printing press wherein the oleo ink is first contact-transferred from the plate to an offset blanket and then is again contact-transferred from said blanket to the copy sheets.

6. The process of claim 5 wherein said non-image portions are cured, solid, essentially linear, elastomeric organopolysiloxane.

7. The process of claim 6 wherein the image areas comprise radiation modified, cured, solid silicone elastomer having an adhesive release value when dry greater than about 100 grams per inch.

8. The process of claim 7 wherein the ink is applied to the plate by application and form rollers which both supply ink and keep the printing plate clean by removing ink from the non-image areas of the plate.

* * * * *